Sept. 27, 1966 W. R. ALVIN 3,275,030
WATER TREATMENT APPARATUS
Filed June 1, 1964
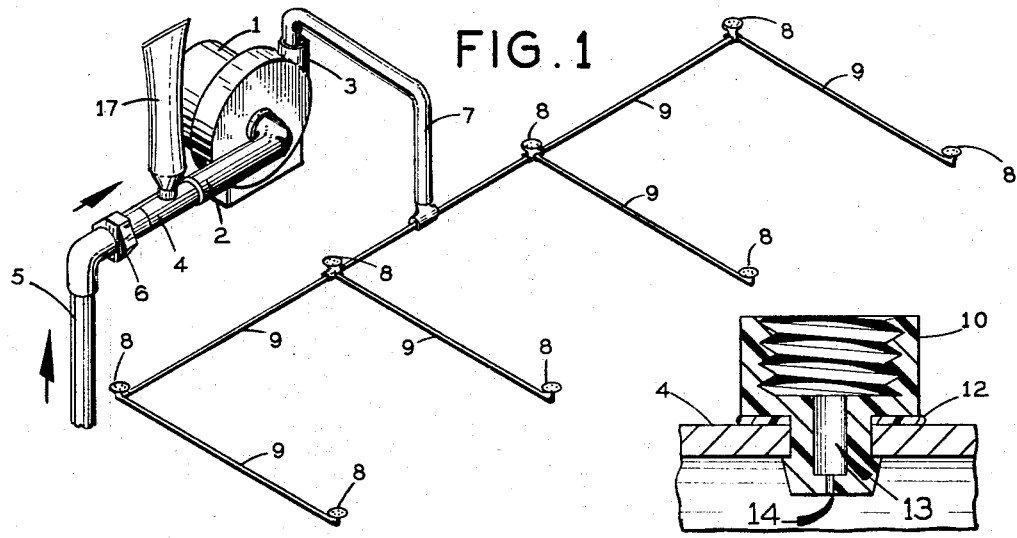
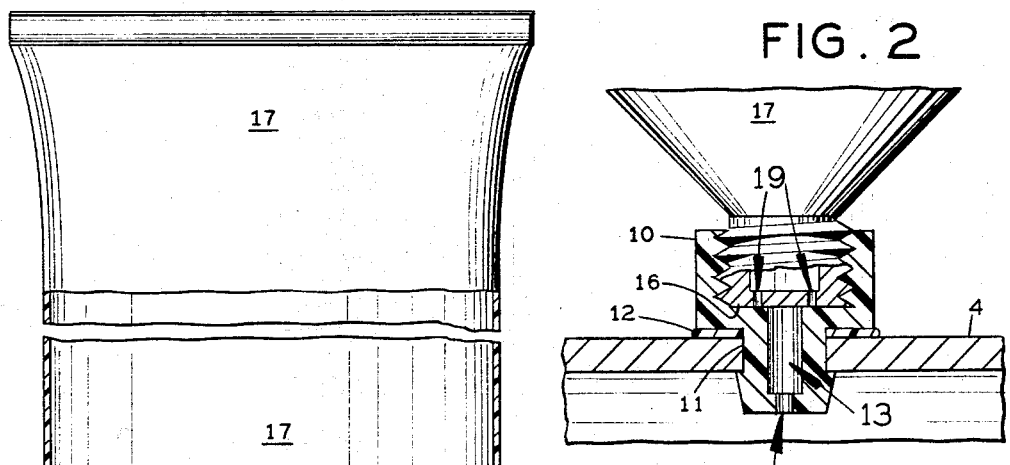
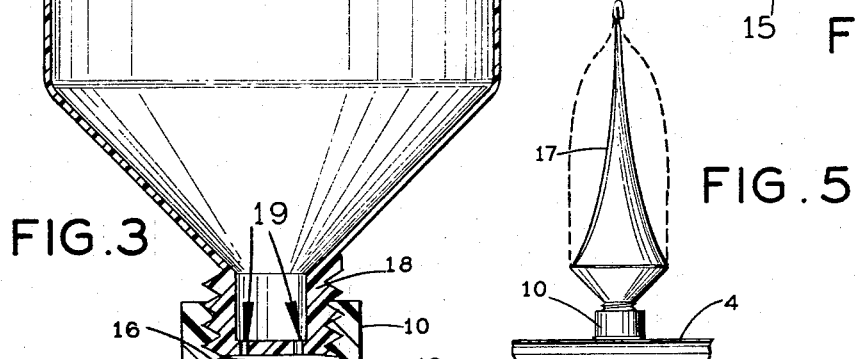
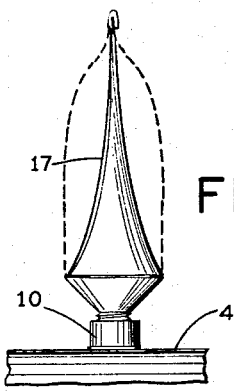
INVENTOR.
WILLIAM R. ALVIN United States Patent Office 3,275,030
Patented Sept. 27, 1966

3,275,030
WATER TREATMENT APPARATUS
William R. Alvin, Coral Gables, Fla.
(11681 SW. 72 Place, Miami, Fla.)
Filed June 1, 1964, Ser. No. 371,392
4 Claims. (Cl. 137—565)

This invention relates in general to water treatment devices and more particularly to a convenient means for injecting chemical treatment into the suction side of a pressure pump in a water supply system.

Prior water treatment devices for injecting softeners, insecticides or fertilizer required the use of complicated means for metering given proportions of chemicals into a given water system and often required pressure or bleeder means for obtaining an automatic flow of chemicals from a container for metered injection into a water system with an attendant relatively high cost. Furthermore, prior devices, particularly those for domestic sprinkler systems, require a relatively high degree of skill in adjusting the flow of chemicals in predetermined proportion to the flow in a water supply.

The present invention overcomes the above objections and disadvantages by the provision of a relatively simple and safe, low cost positive injection means adapted for installation in both new and old water systems which will accept the threaded nozzle of a collapsible tube which requires no air inlet, such as required with solid containers, which tube provides the container for the chemical either in the form of free flowing liquid or in the form of a viscous jelly.

Another object of the invention is the provision of an injection plug adapted to be inserted and self retained in a single hole bored in the suction pipe of a pump for supplying the water from a well or reservoir.

Another object of the invention is the provision of an injection plug secured in the intake pipe of a water supply system into which the outlet nozzle of a collapsible tube of chemicals is threaded therein and which nozzle has one or more outlet passages therethrough which are positioned to be closed against flow when the nozzle is tightly threaded and seated in the injection plug.

Another object of the invention is the provision of an injector means adapted to be secured in the suction pipe of a pressure pump through which a pilot hole is provided for guiding a drill of predetermined diameter for drilling an orifice of predetermined size through said plug corresponding to the degree of suction determined in said pipe.

These and other objects of the invention are described and shown in the following specification and drawing, in which:

FIG. 1 is a perspective illustration of a typical water system with a container for additive chemicals connected therein, in reduced scale.

FIG. 2 is a fragmentary cross sectional elevation of an injection plug shown in FIG. 1.

FIG. 3 is a cross sectional elevation of the plug shown in FIG. 2 with a collapsible container for holding chemicals threaded therein.

FIG. 4 is a fragmentary view of elements shown in FIG. 3 in changed position.

FIG. 5 is a vertical elevation of the container shown in FIG. 3 in collapsed position in reduced scale.

Referring to FIG. 1, a motor driven centrifugal pump 1 is provided with an inlet 2 and outlet 3. A suction pipe 4 connected to inlet 2 is coupled to an inlet pipe 5 by union 6. The pipe 5 is intended to carry water from a source, such as a well or reservoir. The outlet 3 of pump 1 is connected by pipe 7 to a sprinkler network having eight conventional outlets 8 by tubing 9, as shown.

The injection plug 10, preferably made of nylon or other suitable tough plastic material, has a threaded bore therein and is provided with a coaxial cylindrical barbed projection 11 for insertion through a hole in pipe 4 with a compressible gasket 12, preferably made from neoprene or like material, positioned between the conduit 4 and the shoulder of the plug, as shown in FIGS. 2 and 3. The plug is installed by the simple expedient of drilling a hole through suction pipe 4 of predetermined diameter and then by forcing the barbed projection 11 through the hole and compressing the resilient gasket 12 to permit the engagement of the barbed lip, as shown, forming a hermetic seal.

Referring to FIG. 2, it is to be noted that a coaxial bore 13 in the plug terminates in the inner end thereof in a smaller bore 14, or pilot orifice, which will serve as a guide for enlargement by drilling to a predetermined metering orifice 15, shown in FIG. 3, to be hereinafter described.

It is to be noted that the threads in the bore of injector 10 terminate at the inner end thereof in a plane shoulder 16 normal to the axis of the plug.

A collapsible tube 17 made from flexible plastic material, preferably polyethylene or polypropylene, has an integral outlet nozzle 18 threaded to mate the threads in plug 10. When the tube is filled with a predetermined chemical solution or jelly from the opening thereof the tube is closed and sealed by the usual methods of heat sealing or folding and staking.

The nozzle 18 of the tube 17 is provided with one or more parallel outlet passages 19 which are displaced laterally from the coaxial bore 13 in the nozzle, as shown in FIG. 3.

For installation and in operation, a hole of predetermined size is drilled through the wall of the suction pipe 4 of the pressure pump, and since the wall thickness of a given pipe is a standard dimension, the barbed projection 11 of a corresponding plug 10 with a washer-like gasket 12 placed thereon, is forced through the drilled hole which will form a leakproof connection by virtue of the barbed engagement of projection 11 with the inside surface of the conduit and the compression of gasket 12.

Prior to the insertion of the plug 10 in the drilled hole, a vacuum gage or other vacuum indicating device is connected in the hole and the pump operated in a normal manner. It is also apparent that the suction can be measured after the insertion of plug 10 if desired. The observed suction is noted and a corresponding drill selected and upon stopping the pump and disconnecting the vacuum measurement device, the pilot orifice 14 is enlarged by drilling with the aforesaid selected drill forming orifice 15, which orifice corresponds to the desired feeding characteristics of a predetermined chemical containing tube. The collapsible tube containing the desired chemical is threaded part way into the injector as illustrated in FIG. 3 and when the pump is operated, the chemical will be drawn from the tube through the passages 19 into the plug and through orifice 15 into the water to be treated and the tube will be collapsed by atmospheric pressure in proportion to the liquid extracted.

It is now also apparent that the chemical will be thoroughly dispersed in the water by the normal turbulence and agitation by the impeller of the pump. Thus, the pump will distribute a uniform mixture of water and chemical.

When it is desired to discontinue the flow of chemical in the water, the tube is further threaded into the plug until the passages 19 are closed by abutment with the shoulder 16, as shown in FIG. 4.

It is also to be noted that the passages 19 may be preadjusted to diameter for proper proportioning the flow of insecticides, softeners and fertilizers into the injector, or other plugs having predetermined bores therein inserted into the suction pipe of the pump.

It is important to note that when the pumping operation in the system above described is stopped, no attention need be given to the injector system since loss of suction will not occur because of the absence of vents or air bleeders which are required in conventional systems.

It is also understood that the invention comprehends an injection plug made from metal and adapted to be inserted in a suction pipe by conventional threading, brazing, or other well known means and it is also to be noted that conventional collapsible tubes of the tin alloy variety may also be used successfully for the purpose above described.

It is understood that certain modifications in the construction, utilizing the features above described, are intended to come within the scope of the appended claims.

Having described my invention, I claim:

1. A water supply system comprising a motor driven pump having an inlet and outlet means,
    a suction pipe connecting said inlet means with a source of water and pressure pipe means connecting said outlet means to a water distribution system,
    a plug means secured in said suction pipe having a threaded bore therein and a coaxial metering bore of predetermined smaller diameter,
    a collapsible container for retaining a quantity of liquid chemical having a threaded nozzle in mating engagement with said threaded bore,
    at least one orifice through said nozzle into said container positioned for feeding said liquid chemical therefrom whereby said chemical will flow from said container through said metering bore of said plug by suction into said suction pipe for dispersion in said water when the latter is pumped from said source through said suction pipe into said pressure pipe and said system when said pump is energized.

2. A water supply system comprising a motor driven pump having an inlet and outlet means,
    a suction pipe connecting said inlet means with a source of water and pressure pipe means connecting said outlet means to a water distribution system,
    a plug means secured in said suction pipe having a threaded bore therein and a coaxial metering bore of predetermined smaller diameter and a circular shoulder in said plug between said threaded bore and said metering bore,
    a collapsible container for retaining a quantity of liquid chemical having a threaded nozzle in mating engagement with said threaded bore,
    at least one orifice through said nozzle laterally displaced a predetermined distance from the axis thereof into said container positioned for feeding liquid chemical therefrom whereby said chemical will flow from said container through said metering bore of said plug by suction into said suction pipe for dispersion in said water when the latter is pumped from said source through said suction pipe into said pressure pipe and said system when said pump is energized and whereby the threading of the end of said nozzle into contact with said shoulder will close said orifice and prevent the flow of said chemical into said suction pipe.

3. In a water system of the character described a suction pipe having predetermined suction therein,
    an injection plug having a threaded bore therein for holding a container of chemicals threaded therein,
    a collapsible container of chemicals having a threaded nozzle threaded into said bore,
    said plug having a cylindrical projection coaxial with said bore and terminating in a circular barb for retention in a hole through said pipe,
    a resilient gasket surrounding said projection for hermetically sealing said plug to said pipe when said gasket is compressed between said plug and the outer surface of said pipe when said barb is engaged with the inner surface of said pipe,
    said plug having a metering bore through said projection of predetermined diameter for metering the flow of said chemical from said container in proportion to the said suction therein.

4. In a water system of the character described a suction pipe with a predetermined suction therein,
    an injection plug having a threaded bore therein in said pipe for holding a collapsible container of chemicals threaded therein,
    said plug having a metering bore therethrough entering said pipe coaxial with said threaded bore with a circular shoulder therebetween,
    a collapsible container retaining a quantity of liquid chemical having a nozzle threaded for mating engagement with said threaded bore,
    said nozzle having an outlet orifice therethrough positioned parallel and a predetermined distance lateral from the axis thereof whereby said liquid will flow through said orifice and said metering bore into said pipe when said nozzle is partially threaded into said threaded bore and whereby the flow of said chemical will be stopped when the said noozle is threaded into said threaded bore with the end of said nozzle and said orifice in contact with said shoulder.

References Cited by the Examiner

UNITED STATES PATENTS

| | | | |
|---|---|---|---|
| 1,902,003 | 3/1933 | Werder | 222—520 |
| 2,050,522 | 8/1936 | Evans | 137—604 |
| 2,687,831 | 8/1954 | Miller | 222—569 |
| 2,743,913 | 5/1956 | Gundlack | 239—318 |
| 2,965,268 | 12/1960 | Bauerlein | 137—604 |
| 3,052,417 | 9/1962 | Daniel | 239—310 |
| 3,099,283 | 7/1963 | Holdeman | 137—604 |

FOREIGN PATENTS

| | | |
|---|---|---|
| 588,080 | 1/1925 | France. |

M. CARY NELSON, *Primary Examiner.*

W. CLINE, *Assistant Examiner.*